United States Patent [19]

Miyanaga et al.

[11] Patent Number: 4,901,181
[45] Date of Patent: Feb. 13, 1990

[54] MOTOR CONTROL DEVICE

[75] Inventors: Choshich Miyanaga; Kanji Yokomizo, both of Higashimatsuyama, Japan

[73] Assignee: Diesel Kiki Co., Ltd., Tokyo, Japan

[21] Appl. No.: 308,935

[22] Filed: Feb. 9, 1989

Related U.S. Application Data

[63] Continuation of Ser. No. 8,166, Jan. 29, 1987, abandoned.

[30] Foreign Application Priority Data

Jan. 30, 1986 [JP] Japan .............................. 61-12466[U]
Jan. 31, 1986 [JP] Japan .................................. 61-19861

[51] Int. Cl.$^4$ ................................................ H02H 7/09
[52] U.S. Cl. ...................................... 361/33; 318/434; 361/30; 361/31; 361/82
[58] Field of Search .................... 318/434; 361/23, 30, 361/31, 33, 82, 86, 87

[56] References Cited

U.S. PATENT DOCUMENTS

| | | | |
|---|---|---|---|
| 3,926,264 | 12/1975 | Bardwell et al. | 318/434 |
| 4,074,175 | 2/1978 | Born et al. | 318/434 |
| 4,246,622 | 1/1981 | Hosoda et al. | 361/31 |
| 4,378,580 | 3/1983 | Stich | 361/86 |
| 4,473,856 | 9/1984 | Takahashi et al. | 361/31 |
| 4,547,715 | 10/1985 | Li | 361/31 |

*Primary Examiner*—Derek S. Jennings
*Assistant Examiner*—Jeffrey A. Gaffin
*Attorney, Agent, or Firm*—Birch, Stewart, Kolasch & Birch

[57] ABSTRACT

A motor control device controls a motor driving mechanism which drives a motor according to a motor drive signal for providing a normal drive signal and a locked condition signal. When the motor becomes overloaded while being driven by the motor driving mechanism according to the motor drive signal, the motor driving mechanism is controlled by controlling circuitry which inhibits the motor drive signal from being supplied to the motor driving mechanism. The controlling circuitry, while the motor is in the overloaded state, controls the motor driving mechanism so that power is supplied intermittently to the motor, or so that the supply of power for the regular and reverse rotation is given alternately. The controlling circuitry, when the load of the motor becomes normal, allows driving of the motor according to the motor drive signal.

6 Claims, 6 Drawing Sheets

MOTOR CONTROL DEVICE

This application is a continuation, of application Ser. No. 07/008,166 filed on Jan. 29, 1987, now abandoned.

BACKGROUND OF THE INVENTION

The present invention relates to a motor control device for controlling the drive of a motor when it is overloaded.

An example of a conventional control device is shown in the U.S. Pat. No. 4,473,856. This control device detects a load current of a DC motor, and stops the supply of power to the DC motor when the detected load current is more than a predetermined value. If the control device stops the supply of power to the motor, then the control device continues to stop the supply of power to the motor, as long as power is applied to the control device. The control device clears the shutdown of the motor by manual operations to stop the supply of power and reapply power to the control device.

In the case of a drive motor of an air-control door such as an air-mix door and a blower in an airconditioning system for an automobile, for example, the drive motor is locked or overloaded when any foreign substance is caught in the drive mechanism of the air-control door or blower fan, interrupting the rotational movement of the air-control door or the rotation of the fan. In such cases, the release of a foreign substance can return the drive motor to a normal operation when the supply of power to the drive motor is stopped resulting in a sudden removal of the torque of the drive motor from the foreign substance. A foreign substance can also be released by rotating the drive motor in reversely to apply force reverse to it, and that as a result, the operation of the air-control door or the blower becomes normal. Further, in cases when the drive motor is overloaded because of unsmooth operation of the drive mechanism for driving the air-control door, the drive mechanism can be enabled to operate smoothly by repeating the regular and reverse driving of the drive motor.

According to the prior control device, however, the state of shutdown of the motor is continued as is, even when the locked or overloaded condition is cleared after the foreign substance is removed, by stopping the supply of power to the motor. Namely, driving of the motor is not resumed automatically. Also, according to the prior control device, the motor is left at the shutdown state when it is locked or overloaded, therefore, it is not possible to obtain the effect of repetitive regular/reverse driving of the motor. Further, in the prior control device, in order to know whether the motor is released from the lock or overload state, a problem of manually reapplying power to the control device after stopping the supply of power to the motor must be done repeatedly.

SUMMARY OF THE INVENTION

An object of the present invention, therefore, is to overcome the disadvantages and limitations of the prior control device by providing a new and improved motor control device.

Another object of the present invention is to provide a motor control device which can automatically redrive the motor when it is released from the overload state.

Still another object of the present invention is to provide a motor control device which can effectively clear an overload of the motor caused by any foreign substance caught in the mechanisms driven by the motor.

Still another object of the present invention is to provide a motor control device which can effectively clear any overload of the motor caused by unsmooth operation of the mechanisms driven by the motor.

The above and other objects are attained by a motor drive device comprising: motor driving means for supplying a drive output to a motor according to a motor drive signal; load detecting means for detecting the load of said motor and supplying a load signal representing the load of said motor; overload detecting means for receiving the load signal of said load detecting means that detects whether said motor is overloaded or not based on said load signal, and for supplying a detection output representing whether an overload condition exists or not; and control means that are responsive to the detection output of said overload detecting means for controlling said motor driving means so that power for at least one direction of rotation is supplied to said motor intermittently while it is in the overload condition, and for allowing driving of said motor according to said motor drive signal when the load of said motor becomes normal.

BRIEF DESCRIPTION OF THE DRAWINGS

The foregoing and other objects, features and attendant advantages of the present invention will be highly understood as the same becomes better understood by means of the following description and accompanying drawings wherein.

DETAILED DESCRIPTION OF THE INVENTION

Figure 1:
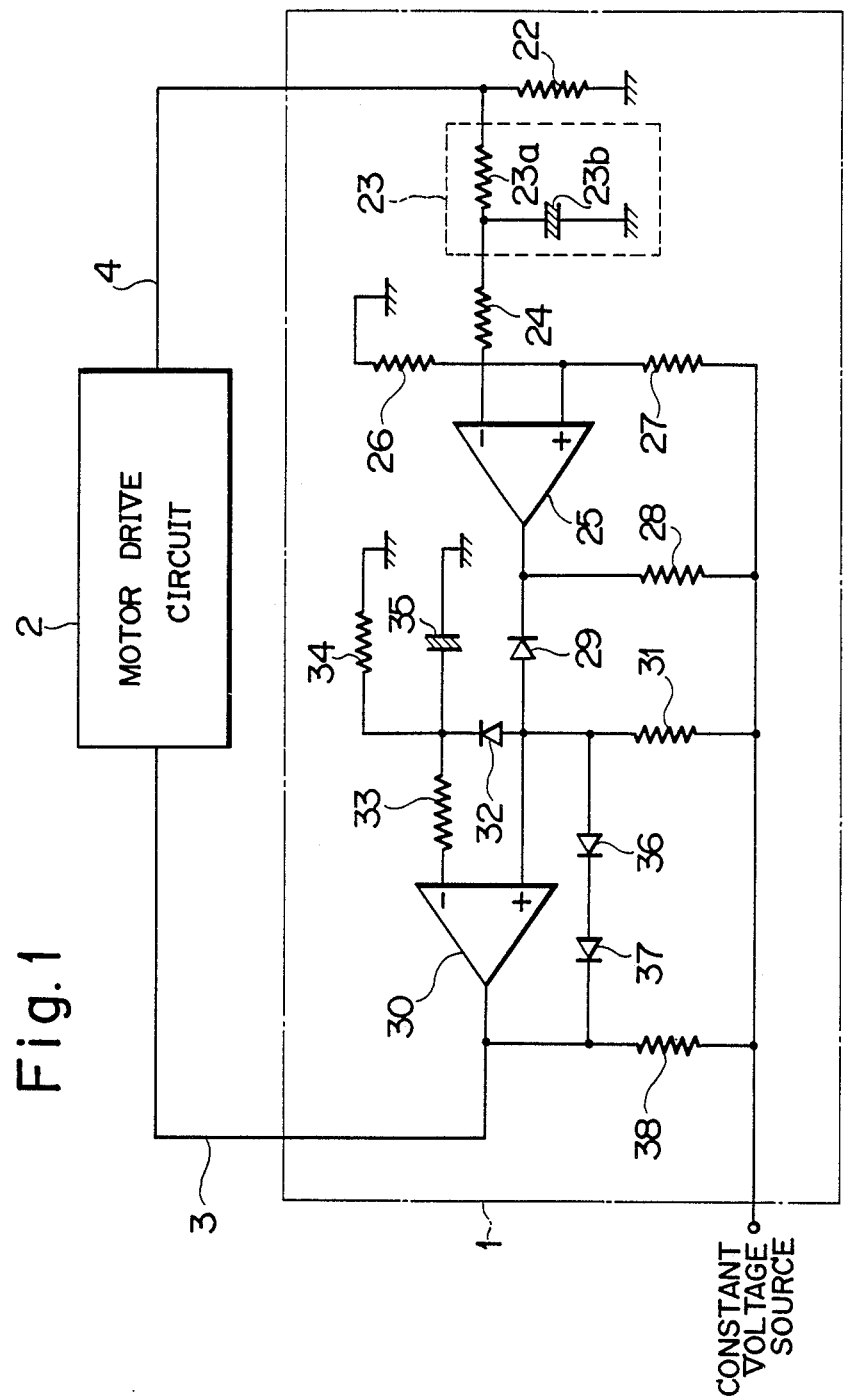
FIG. 1 is a circuit diagram showing the first embodiment of a motor control device according to the present invention.
Figure 2:
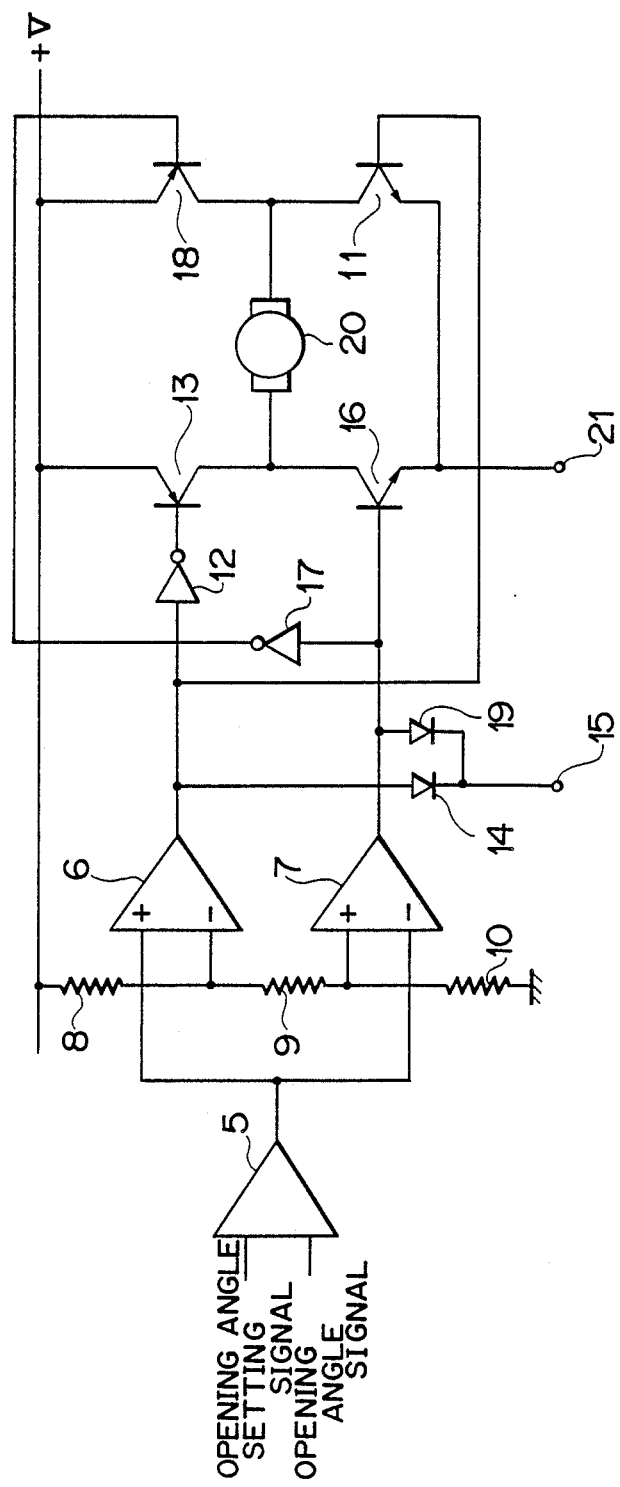
FIG. 2 is a schematic circuit diagram showing an example of the motor drive circuit of FIG. 1.

FIG. 1 and FIG. 2 show the first embodiment of a motor control device according to the present invention.

In FIG. 1, the reference numeral 1 shows a motor control circuit, and the reference numeral 2 shows a motor drive circuit including a DC motor. Between the motor control circuit 1 and the motor drive circuit 2, a control output line 3 for supplying the motor drive circuit 2 with the control output signal of the motor control circuit 1 are arranged, and a load current lead-in line 4 for leading the load current of the DC motor of the motor drive circuit 2 into the motor control circuit 1.

The motor drive circuit 2 is shown in FIG. 2. In this embodiment the motor drive circuit 2 is shown as the drive circuit of the air-mix door in an air-conditioning system for an automobile. The air-mix door, as everybody knows, is provided between the evaporator and heater core, and adjusts the mixing ratio of warm air and cold air by means of the opening angle. The air-mix door is driven by the undermentioned DC motor 20 via a gear mechanism and link mechanism, and its opening angle is adjusted. In the input stage of the motor drive circuit 2, an error operator 5 is provided which receives the opening angle setting signal of the air-mix door and the opening angle signal showing the actual opening angle of the air-mix door. The error operator 5 supplies the output of a specified voltage value when the opening angle setting signal and the opening angle signal are equal, and supplies the error output varying from the said specified voltage value when there is a difference between the opening angle setting signal and the opening angle signal. In the case of this embodiment, an error output that is higher than the said specified voltage value is supplied when the opening angle signal is higher than the opening angle setting signal according to the difference between the opening angle signal and the opening angle setting signal. An error output that is lower than the said specified voltage value is supplied when the opening angle signal is lower than the opening angle setting signal according to the difference between both. The output terminal of the error operator 5 is connected to the positive input terminal of the comparator 6 for regular rotation, and to the negative input terminal of the comparator 7 for reverse rotation. The negative input terminal of the comparator 6 for regular rotation and the positive input terminal of the comparator 7 for reverse rotation are respectively given the reference voltage by three resistors 8, 9 and 10 inserted serially between the power source line and the ground. When the output of the error operator 5 is within the predetermined voltage range set around the said specified voltage value, both comparators 6 and 7 supply the Low-level output. When the output of the error operator 5 is higher than the said voltage range, the comparator 6 for regular rotation supplies the High-level output. When the output of the error operator 5 is lower than the said voltage range, the comparator 7 for reverse rotation supplies the High-level output. The output terminal of the comparator 6 for regular rotation is connected to the base of the NPN transistor 11, to the base of the PNP transistor 13 via the inverter 12, and to the terminal 15 via the diode 14. Said control output line 3 is connected to the terminal 15. The output terminal of the comparator 7 for reverse rotation is connected to the base of the NPN transistor 16, to the base of the PNP transistor 18 via the inverter 17, and to the terminal 15 via the diode 19. Emitters of PNP transistors 13 and 18 are connected to the power source line. The collector of the PNP transistor 13 is connected to the collector of the NPN transistor 16. Between the collector of the PNP transistor 13 and the collector of the NPN transistor 16, one terminal of the DC motor 20 is connected. The collector of other PNP transistor 18 is connected to the collector of the NPN transistor 11. Between the collector of the PNP transistor 18 and the collector of the NPN transistor 11, another terminal of the DC motor 20 is connected. Emitters of NPN transistors 11 and 16 are connected to the terminal 21. Said load current lead-in line 4 is connected to the terminal 21. Transistors 11 and 13 are conductive by the High-level output of the comparator 6 for regular rotation. Transistors 16 and 18 are conductive by the High-level output of the comparator 7 for reverse rotation. The terminal 15 to which the control output line 3 is supplied connected is, as described below, with the control output, either of High-level or Low-level, from the motor control circuit 1. When the terminal 15 is under the High-level condition, the transistors 11, 13, 16 and 18 are turned on and off by outputs of the comparators 6 and 7. When the terminal 15 is under the Low-level condition, the output sides of the comparators 6 and 7 come to the Low-level, and therefore transistors 11, 13, 16 and 18 are cut off.

The load current lead-in line 4 connected to the terminal 21 of the motor drive circuit 2, as shown in FIG. 1, is connected to one end of a detection resistor 22 of the motor control circuit 1. Another end of the detection resistor 22 is grounded. The detection resistor 22 provides a voltage signal representative of the load current of the DC motor 20.

One end of the detection resistor 22 is also connected to a negative input terminal of a first comparator 25 via an integration circuit 23 which has a resistor 23a and a capacitor 23b. The reference voltage is applied to the positive input terminal of the first comparator 25, the reference voltage by resistors 26 and 27 inserted serially between the constant voltage source and ground. The integration circuit 23 prevents rearward-stage circuits from malfunction by inrush current caused at the start of the DC motor 20. The reference voltage of the negative input terminal of the first comparator 25 is set so that the output of the first comparator 25 comes to the High level when the DC motor 20 operates normally, and inverts to the Low level when the motor is locked or overloaded.

The output terminal of the first comparator 25 is connected to the constant voltage source via a resistor 28, and it is also connected to the positive input terminal of a second comparator 30 via a diode 29. The diode 29 is so inserted that the direction from the positive input terminal of the second comparator 30 towards the output terminal of the first comparator 25 becomes the forward direction. The positive input terminal of the second comparator 30 is also connected via the resistor 31 to the constant voltage line, and to an anode of a diode 32. The cathode of the diode 32 is connected via the resistor 33 to the negative input terminal of the second comparator 30, grounded via a resistor 34, and grounded via the capacitor 35. Between the positive input terminal and output terminal of the second comparator 30, two diodes 36 and 37 are inserted by a serial connection so that the direction from the positive input terminal towards the output terminal becomes the forward direction. The output terminal of the second comparator 30 is further connected via the resistor 38 to the constant voltage source, and is connected via the control output line 3 to the terminal 15 of the motor drive circuit 2. The capacitor 35 is charged through the resistor 31 and diode 32 when the outputs of the first and second comparators 25 and 30 are at the High level. The capacitor 35 discharges through the resistor 34 when the output of the first comparator 25 is the Low level, because potential of the positive input terminal of the second comparator 30 drops through the diode 29. The second comparator 30 supplies the High-level output when the output of the first comparator 25 is the High level, because the anode potential of the diode 32 rises by the drop of the forward voltage of the diode 32. When the output of the first comparator 25 inverts to the Low level, the output of the second comparator 30 inverts to the Low level, because the potential of its positive input terminal drops below the potential of its negative input terminal by function of the diode 29. The status of Low-level output of the second comparator 30 is maintained for the specified time until the potential of the negative input terminal of the second comparator 30 drops below the potential of the positive input terminal by the discharge of capacitor 35. The serially connected diodes 36 and 37 decide the potential of the positive input terminal of the second comparator 30 when the capacitor 35 discharges, and the potential of the positive input terminal of the second comparator 30 is raised by their forward voltage drops. Thereby, inversion of the output of the second comparator 30 from High to Low level is surely done.

The operation of said composition is described in the following.

When the DC motor 20 rotates normally, its load current is small. Therefore, the detected voltage of the detection resistor 22 does not exceed the reference voltage of the first comparator 25. The first comparator 25 therefore supplies the High-level output, the capacitor 35 is charged, and the second comparator 30 supplies the High-level output. Under this condition the terminal 15 of the motor drive circuit 2 becomes the High level, and the DC motor 20 is controlled for the regular or reverse rotation based on the output of the comparator 6 or 7.

When the operation of the air-mix door is disturbed and the DC motor 20 becomes locked, the over-load current flows through the detection resistor 22. Therefore, the detected voltage of the detection resitor 22 rises above the reference voltage of the first comparator 25, and the output of the first comparator 25 inverts to the Low level. When the output of the first comparator 25 becomes the Low level, the potential of the positive input terminal of the second comparator 30 falls below the potential of its negative input terminal, and so the output of the second comparator 30 inverts to the Low level and the capacitor 35 starts discharging at the same time. With the output of the second comparator 30 turned to the Low level, the output sides of comparators 6 and 7 of the motor drive circuit 2 becomes a Low level, and the transistors 11, 13, 16 and 18 are cut off, thereby stopping supply of power to the DC motor 20. It results in the stop of the load current flow, and the output of the first comparator 25 inverts to the High level. Consequently, current flows through the resistor 31 and diodes 36 and 37 to the output side of the second comparator 30, and the potential of the positive input terminal of the second comparator 30 corresponds to the drop of forward voltage of diodes 36 and 37. As the discharge of capacitor 35 progresses, resulting in the potential of the negative input terminal of the second comparator 30 to fall below the potential of its positive input terminal, the output of the second comparator 30 returns to the High level. The duration time of the Low-level output of the second comparator 30 follows the time constant fixed by the capacitor 35 and resistor 34.

With the output of the second comparator 30 returned to the High level, supply of power to the DC motor 20 is resumed. If the DC motor 20 is left locked even by resuming supply of power, then the output of the first comparator 25 reinverts to the Low level, causing the output of the second comparator 30 to invert to the Low level, and the above-mentioned operation is repeated.

In the case of the first embodiment as described above, overloading is to be detected based on the over-current of the motor, but another composition to detect overloading based on the rotation speed of the motor, is also acceptable.

According to the said embodiment, removal of the foreign substance, when it is caught in the drive system of the air-mix door causing the DC motor 20 to be overloaded, becomes easier because the torque of the DC motor 20 is applied intermittently to the foreign substance. When the foreign substance is removed, the supply of power to the DC motor 20 is resumed automatically.

Figure 3:
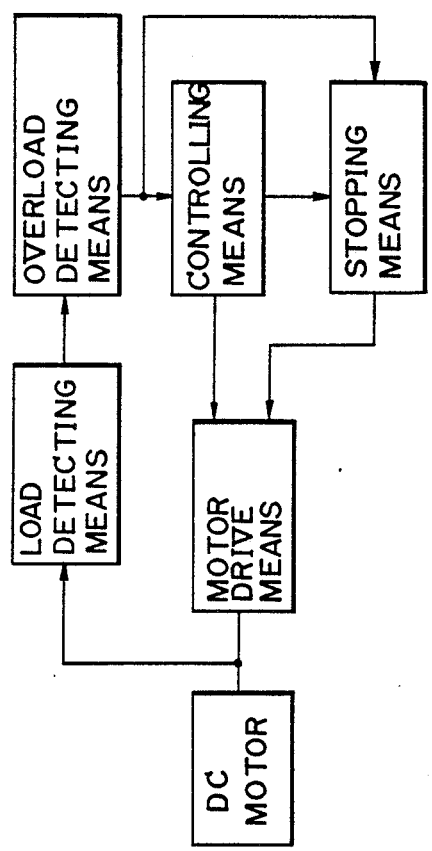
FIG. 3 is a basic block diagram showing the second embodiment of a motor control device according to the present invention.
Figure 4:
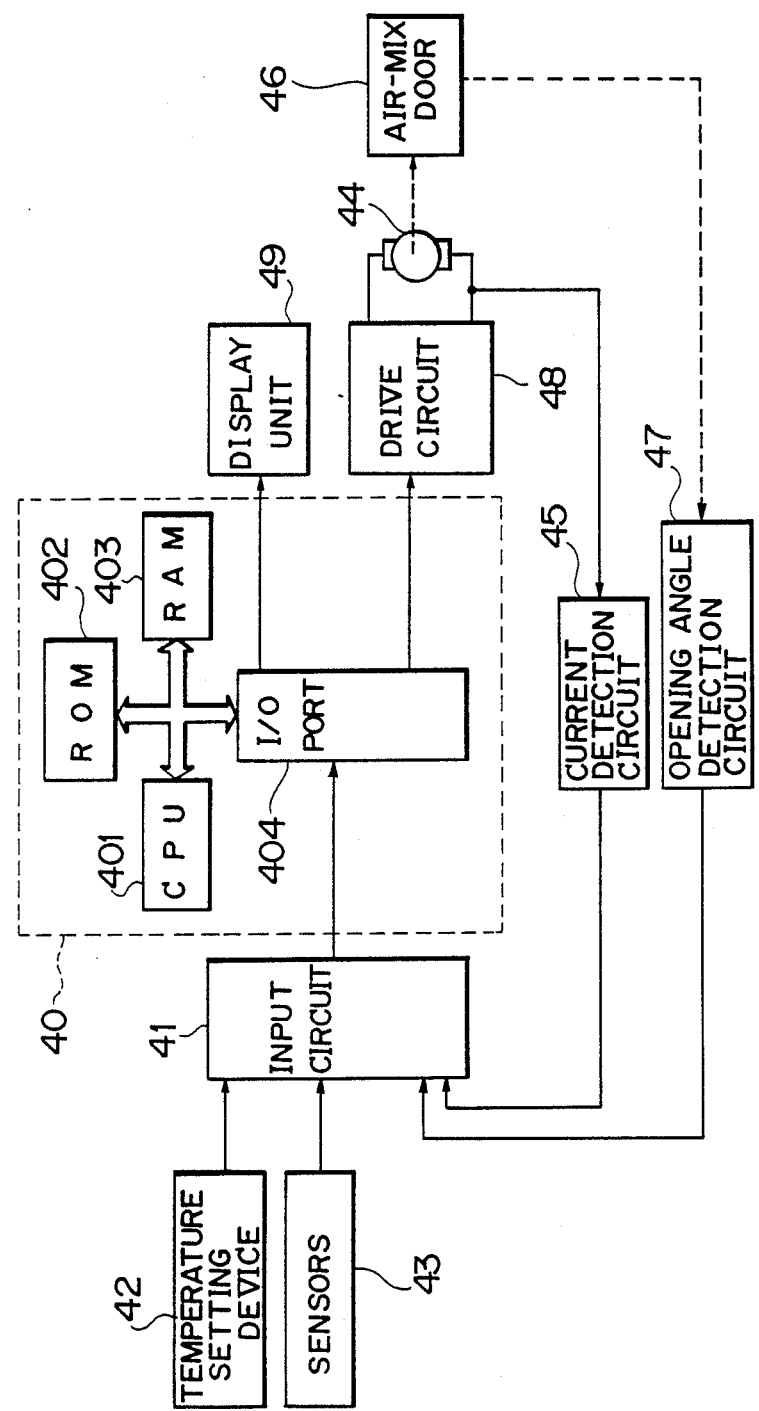
FIG. 4 is a block diagram showing the second embodiment of the present invention based on the basic composition of FIG. 3, and FIG. 5 (A) and FIG. 5 (B) show the control flow chart of the microcomputer of FIG. 4.
Figure 5:
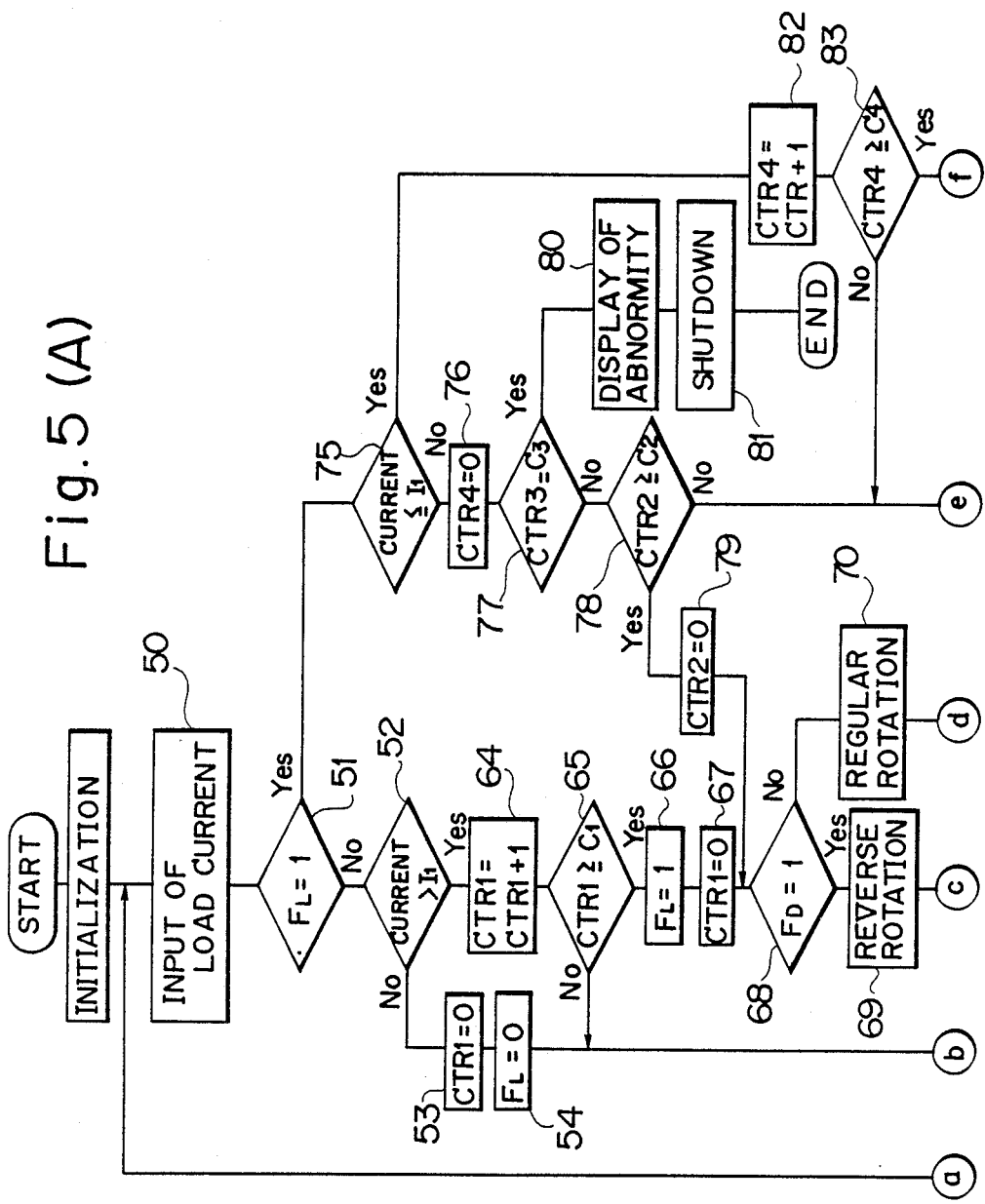
Figure 5:
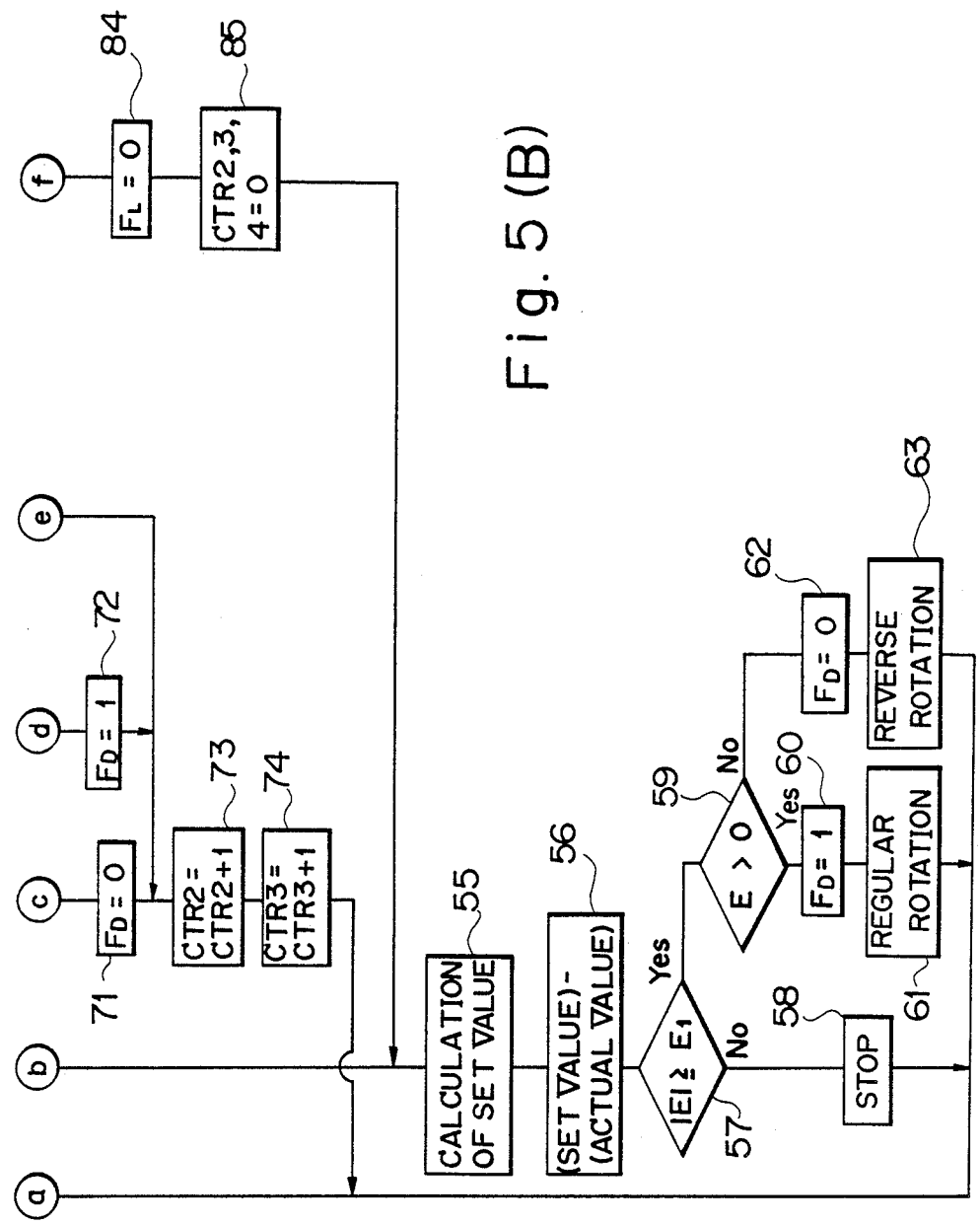

FIGS. 3, 4 and 5 show the second embodiment of a motor control device according to the present invention.

In the block diagram of FIG. 3 showing the basic composition, the load detecting means receives the load current of the DC motor and supplies the load signal representing the load current to the overload detecting means. The overload detecting means detects whether the DC motor is overloaded or not based on the load signal. The overload signal to the control means and the stopping means are supplied when the motor is overloaded. The normal load signal to the control means and stopping means are supplied if the motor is not overloaded. The control means, after being supplied with the overload signal, supplies the switching signal to the motor driving means and stopping means for driving the DC motor alternately between the regular and reverse rotation for a predetermined time, until the normal load is supplied. The stopping means, based on the switching signal and the output signal of the overload detecting means, detects whether the regular and reverse rotation of the DC motor is performed continuously for a specified time or for a number of specified times. When the stopping means it has been performed as specified, it supplies the stop signal to the motor driving means for stopping the driving of the DC motor. The motor driving means drives the DC motor according to a control signal (not shown in FIG. 3) when the DC motor is not overloaded. The motor driving means, by receiving the switching signal, drives the DC motor for the regular or reverse rotation following the switching signal instead of driving of the DC motor following the control signal. The motor driving means, when it has stopped the supply of the switching signal, resumes driving of the DC motor following the control signal. Also, the motor driving means, by receiving the stop signal, stops the supply of power to the DC motor irrespective of the presence of the control and switching signal.

It is clear from the above description that, when the DC motor is overloaded, the regular/reverse rotation of the DC motor is performed for the specified time or for the specified number of times. If overloading of the DC motor is cleared during this while, then the driving of the DC motor following the control signal will automatically resume. If overloading is not cleared even after the regular/reverse rotation of the DC motor has been performed for the specified time or for the specified number of times, then the supply of power to the DC motor is stopped.

FIG. 4 is the second embodiment of the present invention based on the basic composition of FIG. 3. This embodiment shows the motor drive device for driving the air-mix door in an air-conditioning system for an automobile.

In FIG. 4, the reference numeral 40 is a microcomputer. The microcomputer 40 provides a CPU 401, a ROM 402 for storing control programs, a RAM 403 for storing data, and an I/O port 404.

A set temperature information of a temperature setting device 42, detection information of various sensors, a load current information of a current detection circuit 45 for detecting a load current of a DC motor 44, and an opening angle information of an opening angle detection circuit 47 for detecting an actual opening angle of an air-mix door 46 are supplied via an input circuit 41 including a multiplexer, A/D converter, etc. to the I/O port 404. The sensor information includes room temperature, external atmospheric temperature, etc., and this detected information together with the set temperature information are used for calculating the set opening angle of the air-mix door 46. The DC motor 44, provided inside an actuator which is not shown in the figure, is driven for the regular/reverse rotation by a drive circuit 48 under the control of the microcomputer 40. The air-mix door 46 is connected via a link mechanism to the actuator which contains the DC motor 44, and is driven, by the rotation of the DC motor 44. Control of the opening angle of the air-mix door 46 is effected by supplying the control signal from the microcomputer 40 to the drive circuit 48 so that the actual opening angle of the air-mix door 46 becomes the set opening angle, based on the set angle determined by a calculation and the actual opening angle detected by the opening angle detection circuit 47.

The RAM 403 of the microcomputer 40 includes memory areas for soft-counters CTR1, CTR2, CTR3 and CTR4.

The soft-counter CTR1 is for judging whether the overload current is derived from the motor locking or from the inrush current at the time of the motor starting when the load current of the DC motor 44 exceeds a predetermined value $I_1$. The soft-counter CTR1, as mentioned later, is increased +1 at every passage of the program. A judgement is made on whether the motor locking or the inrush current at the time of the motor starting, is done by a comparison between the contents of the soft-counter CTR1 and a predetermined value $C_1$. The time for the soft-counter CTR1 to count up to the predetermined value $C_1$ is selected so that it is longer than the duration time of the inrush current at the time of the motor starting. When the contents of the soft-counter CTR1 exceeds the predetermined value $C_1$, a judgement is made as to whether the DC motor is overloaded.

The soft-counter CTR2 specifies the power supplying time for the regular rotation and the reverse rotation of the DC motor 44. The soft-counter CTR2, as mentioned later, is increased +1 at every passage of the program. The time specifying is detected by comparison between the contents of the soft-counter CTR2 and a predetermined value $C_2$. The time for the soft-counter CTR2 to count up to the predetermined value $C_2$ is the power supplying time for the regular and reverse rotation.

The soft-counter CTR3 specifies the duration time of the supply of power for the regular/reverse rotation (trying time). The soft-counter CTR3, as mentioned later, is increased +1 at every passage of the program. The trying time is detected by a comparison between the contents of the soft-counter CTR3 and a predetermined value $C_3$. The time for the soft-counter CTR3 to count up to the specified value $C_3$ is the trying time. When overloading of the DC motor 44 is recognized, power is supplied for the regular/reverse rotation during the trying time. If the overloaded state of the DC motor 44 is not cleared after passing the trying time, then the supply of power to the DC motor 44 is stopped and an abnormity display is given by a display unit 49.

The soft-counter CTR4, when the overload current of the DC motor 44 drops below the predetermined value $I_1$, judges whether this drop of the load current is due to a clearing of motor locking or due to a switching between the regular and reverse rotation. The soft-counter CTR4, as mentioned later, is increased +1 at every passage of the program. A judgement is made on whether the motor locking is cleared or not is done by a comparison between the contents of the soft-counter CTR4 and a predetermined value $C_4$. When the load current continues to be below the predetermined value $I_1$ until the soft-counter CTR4 counts up the predetermined value $C_4$, the motor locking is judged as having been cleared.

In this embodiment, a lock flag $F_L$ and a rotating direction flag $F_D$ are provided, too. The lock flag $F_L$ is "1" when the DC motor 44 is overloaded and "0" when it is normally loaded. The rotating direction flag $F_D$ is to show the direction of the power supply of the DC motor 44. The flag $F_D$ is "1" when power is supplied for the regular rotation, and "0" when power is supplied for the reverse rotation.

FIG. 5 (A) and (B) show the control flow chart of the microcomputer 40 of FIG. 4. Terminals a-f of FIG. 5 (A) are connected to corresponding terminals a-f of FIG. 5 (B).

When the program starts, an initialization is performed. By this initialization, the soft-counters CTR1-CTR4, and flags $F_L$ and $F_D$ are reset to "0". Then in the step 50, the load current of the DC motor 44 is input. After the input load current has been stored temporally, the state of the lock flag $F_L$ is judged in the step 51. Since the lock flag $F_L$ has been reset to "0" in the initialization step, the program proceeds to the step 52. In the step 52, the input load current is compared with the predetermined value $I_1$. Since supply of power to the DC motor 44 has not been done yet, the load current is zero. As a result, the program proceeds through steps 53 and 54 to the step 55 of FIG. 5 (B). In the step 55, the sensor information and the set temperature are input, and the set opening angle of the air-mix door 46 is calculated. Then in the following step 56, the actual opening angle of the air-mix door 46 is input, and the error E between the actual opening angle and the set opening angle is calculated. In the following step 57, the error E is compared with the predetermined value $E_1$. The predetermined value $E_1$ is the reference value judging whether to drive the DC motor 44 or not. The DC motor 44 is stopped when the absolute value of the error E is smaller than the predetermined value $E_1$, and is driven when the absolute value of the error E is equal to or larger than the predetermined value $E_1$. When stopping, the program is returned through step 58 to step 50, and power is not supplied to the DC motor 44. When driving, the program proceeds from the step 57 to the step 59, where the required direction of rotation is judged. Whether the error E is larger than zero or not determines the required direction of rotation. A regular rotation if the error E is larger than zero, or a reverse rotation if the error E is smaller than zero. When the direction of rotation is judged as a regular rotation, the rotating direction flag $F_D$ is set to "1" in step 60, and, after control for the regular rotation of the DC motor 44 has been done in the step 61, program are returned to step 50. When the direction of rotation is judged as a reverse rotation, the rotating direction flag $F_D$ is reset to "0" in the step 62, and after the control for reverse rotation of the DC motor 44 has been done in step 63, program is returned to step 50.

When processing for the regular or reverse rotation is done, the supply of power to the DC motor 44 is started, and thereby inrush current flows. By this, load current temporally exceeds the predetermined value $I_1$, and the program proceeds from step 52 to step 64. In step 64, the soft-counter CTR1 is increased +1, and in following step 65, the contents of the soft-counter CTR1 is compared with the predetermined value $C_1$. The duration time of the inrush current is shorter than time for the soft-counter CTR1 to count up to the predetermined value $C_1$, therefore, in the case of the inrush current at the starting time of the DC motor 44, the program proceeds from step 65 to step 55, and the control of the opening angle of the air-mix door 46 is performed. After the inrush current has disappeared, the input load current falls below the predetermined value $I_1$, and thereby the program proceeds from step 52 to step 53, and the contents of the soft-counter CTR1 are reset.

When the DC motor 44 is not overloaded, the said operation is repeated.

If the DC motor 44 is locked during driving, the lock current is input in step 50. Since the lock flag $F_D$ is "0", the program proceeds from step 51 to step 52. Until the soft-counter CTR1 reaches the predetermined value $C_1$, the program, as in the case of the inrush current, proceeds through steps 64 and 65 to step 55, and after controlling the air-mix door, it is returned to step 50. When the soft-counter CTR1 reaches the predetermined value $C_1$, the program proceeds from the step 65 to the step 66. In step 66, the lock flag $F_L$ is set to "1", and after the soft-counter CTR1 has been reset in the following step 67, the rotating direction flag $F_D$ is judged in step 68. If the DC motor 44 is locked under the supply of power for the direction of the regular rotation, then the rotating direction flag $F_D$ is set to "1" by processing of step 60. If the DC motor 44 is locked under the supply of power for the direction of the reverse rotation, then the rotating direction flag $F_D$ is reset to "0" by processing of step 62. In the former case, namely when the DC motor 44 is locked under the supply of power for the direction of the regular rotation, the program proceeds from the step 68 to the step 69, and the supply of power for the reverse rotation is done. In the latter case, or when the DC motor 44 is locked under the supply of power for the reverse rotation, the program proceeds from the step 68 to the step 70, and the supply of power for the regular rotation is done. After the processing for the reverse rotation in step 69, the rotating direction flag $F_D$ is reset to "0" in step 71. After the processing for the regular rotation in step 70, the rotating direction flag $F_D$ is set to "1" in the step 72. Then the program proceeds to steps 73 and 74, and the soft-counters CTR2 and CTR3 are increased +1, respectively. After step 74, the program is returned to step 50.

When the program is returned to step 50, a new load current is input and the program proceeds to step 51. As the lock flag $F_D$ has been set to "1" in step 66, the program proceeds from step 51 to step 75. In step 75, the load current is compared with the predetermined value $I_1$. When the motor locking is cleared, the load current becomes falls below the predetermined value $I_1$. Or, when the motor locking is present, it may occur that the load current will fall below the predetermined value $I_1$ at the switchings between the supply of power for the regular and reverse rotation.

So far as the load current under the presence of motor locking, which is larger than the predetermined value $I_1$, is input in the step 50, the program proceeds from step 75 through step 76 to step 77. In step 77, the contents of the soft-counter CTR3 are compared with the predetermined value $C_3$, and whether the trying time should be terminated or not is judged. If the trying time is not terminated, then the program proceeds to the following step 78, and by comparison between the contents of the soft-counter CTR2 and the predetermined value $C_2$, the termination of the supplying time for the present direction of the power supply to the DC motor 44 is judged. If the supplying time for the present direction of power supply is terminated, then the program proceeds through step 79 to step 68. The soft-counter CTR2 is reset in step 79. By proceeding to step 68, the switching of the direction of the power supply is performed (step 69 or 70), and the rotating direction flag $F_D$ is set or reset according to the new direction of the power supply (step 71 or 72). And, after incrementing the soft-counters CTR2 and CTR3 has been done (step 73 and 74), the program is returned to step 50. If the supplying time for the present direction of power supply is not terminated, then the program proceeds from step 78 to step 73, and incrementing of the soft-counters CTR2 and CTR3 are done in steps 73 and 74. Thereafter the program is returned to step 50. So far as a load current larger than the predetermined value $I_1$ is input in step 50 under the presence of motor locking, the supply of power to the DC motor 44 for the regular and reverse rotation is repeated alternately by repeating the above-mentioned operation. When the termination of the trying time is recognized in step 77, the program proceeds from step 77 to step 80, where the abnormality display is given, and in the following step 81, the supply of power to the DC motor 44 is stopped and the program ends.

When the load current input in step 50 drops below the predetermined value $I_1$ for clearing the motor locking or switching the power supply for the regular and reverse rotation, the program proceeds from step 75 to step 82. In step 82, the soft-counter CTR4 is increased +1. Then in the following step 83, by a comparison between the contents of the soft-counter CTR4 and the predetermined value $C_4$, the drop of the load current is judged as to whether it is due to a clearing of the motor locking or to a switching between the supply of power for the regular and reverse rotation. If the drop of the load current is due to a switching of the direction of the power supply, then the load current will return to a value larger than the predetermined value $I_1$ in a short time, and the soft-counter CTR4 is reset in step 76. Therefore, the soft-counter CTR4 does not count up to the predetermined value $C_4$. If the contents of the soft-counter CTR4 does not attain to the predetermined value $C_4$, then the program proceeds from step 83 to step 73, and the soft-counters CTR2 and CTR3 are increased +1 in steps 73 and 74. Then, a new load current is input in the step 50, and the program proceeds through the step 51 to the step 75 again. If the drop of the load current is due to a switching of the direction of the power supply, then the load current returns above the predetermined value $I_1$ before the soft-counter CTR4 counts up to the predetermined value $C_4$. Therefore, the program proceeds from step 75 to step 76, the soft-counter CTR4 is reset and the overloading control is continued. If the drop of the load current is due to a clearing of the motor locking, and it continues to be below the predetermined value $I_1$, then the soft-counter CTR4 will reach the predetermined value $C_4$. Thereby, the program proceeds from step 83 to step 84, and after the lock flag $F_L$ is reset to "0" in step 84, the soft-counters CTR2, CTR3 and CTR4 are reset in the following step 85. Thereafter, the program proceeds to step 55, and the control of the opening angle of the air-mix door 46 is resumed.

In the second embodiment described above, the supply of power for the regular and reverse rotation under the motor lock condition is time controlled by the soft-counter CTR3. The number of times that the power supply for the regular and reverse rotation is counted is another composition, and the supply of power to the DC motor 44 is stopped by the number of times that the predetermined value is reached, is also acceptable.

According to the second embodiment, when the DC motor 44 is overloaded by a foreign substance that is caught in the drive system of the air-mix door 46, the direction of the torque of the DC motor 44 to the foreign substance inverts, enabling the foreign substance to be removed easily. When the foreign substance is removed, the supply of power to the DC motor 44 is continued automatically.

In the first and second embodiments, the motor control device applied to the air-mix door in the air-conditioning system for automobile has been explained, but it is not limited to the use of that device. The motor control device of course can be applied extensively to blowers of air-conditioning systems for automobiles or to other motor circuits.

From the foregoing it will now be apparent that a new and improved motor control device has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A motor control device for controlling a motor comprising:

motor driving means for supplying power to said motor and driving said motor in a first direction in response to a motor drive signal;

load detecting means for detecting a load of said motor and for developing a load signal in response thereto;

overload detecting means, responsive to said load signal, for determining whether said motor is in an overload condition by comparing the load signal to a predetermined reference load value indicative of an overload condition, said overload detecting means developing an overload signal when said overload condition is detected and developing a normal condition signal when said overload condition is absent; and controlling means, responsive to the overload condition signal of said overload detecting means, for inhibiting said motor drive signal for a predetermined time period, and for supplying a control signal to said motor driving means during said predetermined time period for alternately driving said motor between said first direction and in a second direction opposite to said first direction;

said overload detecting means again determining after said predetermined time period has elapsed whether said motor is in said overload condition and developing said overload condition signal to again initiate inhibition of the motor drive signal from said motor driving means for said predetermined time period if an overload condition continues to exist;

said motor driving means being responsive to said normal condition signal and resupplying said motor drive signal to said motor driving means upon the elapse of said predetermined time period when said overload condition is absent;

said overload detecting means, said controlling means, and said motor driving means collectively operating to intermittently and reversibly drive said motor driving means during said overload condition.

2. A motor control device according to claim 1 including stopping means, responsive to the overload condition signal of said overload detecting means, for detecting whether the control signal has been supplied to said motor driving means for a predetermined drive time under the condition that said motor is continuing in the overload condition, and for stopping the supply of power by said motor driving means to said motor when the driving of said motor has been done for said predetermined drive time, said predetermined drive time being greater than said predetermined time period.

3. A motor control device according to claim 1, wherein said overload detecting means detects the overload condition of said motor when said load signal exceeds said predetermined reference load value for a first set time period, and said overload detecting means detects clearing of the overload condition when said load signal falls below said predetermined reference load value for a second set time period after the overload condition is detected.

4. A motor control device according to claim 3, wherein said first set time period is set longer than a duration of time that corresponds to an in rush current resulting from starting said motor, and said second set time period is set longer than a duration of time resulting from values below said predetermined reference load value at a time of switching of the direction to said motor.

5. A motor control device according to claim 1, wherein said controlling means includes power direction recognizing means for recognizing the direction that said motor is being driven by temporally memorizing the direction, said controlling means changing the direction that said motor is being driven to an opposite direction from the direction recognized by said power direction recognizing means when said predetermined time period elapses.

6. A motor control device according to claim 1 including stopping means, responsive to the overload condition signal of said overload detecting means, for detecting whether said motor has been alternately driven for a predetermined number of times under the condition that said motor is continuing in the overload condition, and stopping the supply of power by said motor driving means to said motor when said motor has been alternately driven for said predetermined number of times.

* * * * *